United States Patent Office 3,314,870
Patented Apr. 18, 1967

3,314,870
PHOTOCHEMICAL PROCESS FOR PREPARING CHLORO-SULFONYL CARBOXYLIC ACID CHLORIDES
Peter Borner, Kamen, Germany, assignor to Schering AG., Berlin, Germany
No Drawing. Filed Oct. 28, 1963, Ser. No. 319,535
Claims priority, application Germany, Nov. 2, 1962, Sch 32,276
4 Claims. (Cl. 204—158)

The present invention relates to sulfo-carboxylic acid halides and to methods for making the same.

The reaction of aliphatic hydrocarbons with sulfur dioxide and chlorine under irradiation with actinic light is known in the prior art to lead in a smooth reaction to the formation of alkyl sulfochlorides. On the other hand, it has been said that the sulfochlorination of oxygen-containing organic compounds proceeds altogether unfavorably because of a preferential uptake of chlorine in the molecule with the exclusion of sulfur.

According to the present invention, compounds containing both —COCl and —SO₂Cl groups in the same molecule are prepared by reacting aliphatic and alicyclic carboxylic acid chlorides having at least one —C—H bond in the β-position to the —COCl group, or located farther from the —COCl group, with sulfur dioxide and chlorine under irradiation with actinic light at a temperature of from about −40° C. to about 100° C., particularly between about −20° C. and about 40° C. It could not be foreseen that this reaction of carboxylic acid chlorides with sulfur dioxide and chlorine would lead to the formation of sulfochloride derivatives of the carboxylic acid chlorides, or that the reaction products would be stable enough to be recovered, e.g. on heating during conventional distillation steps.

To discourage chlorination of the starting and end products in addition to the desired sulfochlorination, as well as to discourage multiple substitution of —SO₂Cl groups into the carboxylic acid chloride molecule, the reaction is suitably carried out until about 50–70 percent of the carboxylic acid chloride starting material has reacted. Also, for the same reasons, it is desirable to perform the reaction in the presence of solvents inert under the reaction conditions employed.

On sulfochlorinating pivaloyl chloride under the conditions mentioned, a uniform product, the double acid chloride of sulfopivalic acid, having the following structure

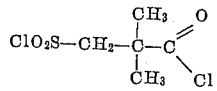

is obtained. In the reaction of propionyl chloride with SO₂ and chlorine, the double acid chloride of β-sulfopropionic acid is almost exclusively obtained. A sulfochlorination in the α-position to the carboxylic acid chloride group does not occur to a significant extent. For the higher carboxylic acid chlorides, substitution occurs in the gamma, delta, and further positions to the carboxylic acid chloride group in addition to substitution in the beta position, so that mixtures of position isomers of the double acid chlorides of the corresponding sulfo-carboxylic acids are formed.

In this fashion the sulfochlorides of the acid chlorides of saturated aliphatic and saturated cycloaliphatic carboxylic acids such as propionic acid, iso- and n-butyric acid, valeric acid, caproic acid, lauric acid, pivalic acid, α,α-dimethyl valeric acid, cyclopentane carboxylic acid and hexahydrobenzoic acid can be obtained. The velocity of the sulfochlorination decreases with increasing molecular weight of the acid chloride starting material employed. Thus, the sulfochlorination of acid chlorides having more than twelve carbon atoms proceeds slowly in comparison with the sulfochlorination of acid chlorides having a smaller number of carbon atoms.

For the sulfochlorination of carboxylic acid chlorides, sulfur dioxide and chlorine are advantageously introduced into the reaction medium as a finely divided gas stream, wherein the molar ratio of sulfur dioxide to chlorine can be varied over a wide range between about 0.5 and 20, preferably between about 1 and 3. Pressure may be used to raise the saturation concentration of the gases in the reaction medium if desired. As solvents, materials which do not react, or react only slightly with sulfur dioxide and chlorine under the conditions of the reaction, are suitably employed. Hydrocarbons and halohydrocarbons, aliphatic and aromatic, are suitably employed, such as carbon tetrachloride, hexachloroethane, tetrachloroethane, benzene, etc., for example. Other suitable materials will be self-evident to the skilled organic chemist. For initiation and maintenance of the reaction, irradiation with light of wavelengths from about 2000 A. to 7000 A., preferably from about 3000 A. to about 5000 A., is employed.

The process can be carried out in a continuous fashion by continuous removal and separation of the end product and of unreacted starting products from the reaction mixture, with return of the unreacted carboxylic acid chloride to the reaction zone.

The sulfo-carboxylic acids of the invention are useful as intermediate products in pharmaceutical chemistry and in the preparation of plastics. The preparation of polyesters and polyamides from dicarboxylic acid chlorides and bis-phenols or diamines by interphase polymerization techniques is known in the art. By reaction of the sulfo-carboxylic acid chlorides of the invention with bis-phenols using interphase polymerization methods, the polyesters of the corresponding sulfo-carboxylic acid chlorides are easily obtained, whereas these products could not be obtained by a reaction of the molten sulfo-carboxylic acids and bis-phenols. Thus, the reaction of sulfo-pivalic acid dichloride with 4,4′-dioxydiphenyl-2,2-propane forms a polyester melting about 130° C. which is very resistant to hydrolysis and can be worked into filaments when molten.

A better understanding of the present invention and of its many advantages can be had by referring to the following specific examples, given by way of illustration.

*Example 1*

190 gm. of gaseous chlorine and 310 gm. of sulfur dioxide were introduced into 1000 gm. of pivaloyl chloride over the course of 5½ hours, with cooling to a temperature of 5°–8° C. The reaction took place in a cylindrical reaction vessel equipped with a condenser, gas inlet stirrer, thermometer, and a Hanau No. 313 quartz immersion (3660 A.) lamp which irradiated the vessel. Subsequently, nitrogen was introduced for 45 minutes for removal of dissolved hydrogen chloride and sulfur dioxide. Unreacted pivaloyl chloride and some sulfuryl chloride formed in a side reaction were then removed in a weak vacuum, and finally a mixture of pivaloyl chloride and a little chloropivaloyl chloride were distilled off under the vacuum produced by a water aspirator.

347 gm. of a high-boiling distillation remainder were obtained which comprised almost exclusively the double acid chloride of sulfopivalic acid. For preparation of an analytically pure product, this residue was distilled under a good vacuum. Thereby, 322 gm. of the double acid chloride of sulfopivalic acid were obtained, having a boiling point of 65°–71° C. at 10⁻⁴ mm. Hg ($n_D^{20}$=1.4870).

Example 2

Proceeding as in Example 1, 768 gm. of propionic acid chloride were reacted with 138 gm. of gaseous chlorine and 247 gm. of sulfur dioxide at 3°–10° C. over the course of six hours. For removal of dissolved gases, nitrogen was introduced for one hour. Subsequently, by-produced sulfuryl chloride, unreacted propionyl chloride, and a small amount of chloropropionyl chloride were distilled off under a weak vacuum. The high-boiling distillation residue (146 gm.), principally comprising the double acid chloride of β-sulfo-propionic acid, was distilled under a good vacuum for separation from accompanying substances present in small amounts. 131 gm. of the double acid chloride of sulfopropionic acid were obtained. Boiling point: 58°–63° C. at $10^{-3}$ mm. Hg ($n_D^{20} = 1.4956$).

Example 3

The procedure of Examples 1 and 2 was used for the sulfochlorination of 1000 gm. of α,α-dimethyl-valeryl chloride by introduction of 140 gm. of chlorine gas and 270 gm. of sulfur dioxide into a reaction vessel cooled to 3°–9° C. over a period of five and one-half hours, followed by an hour-long introduction of nitrogen. The unreacted starting product was distilled off together with some sulfuryl chloride and chloro-dimethyl valeryl chloride under a vacuum of 15–0.1 mm. Hg. The remaining distillation residue (345 gm.) was subsequently fractionated under high vacuum, whereby 296 gm. of a mixture of position isomers of double acid chlorides of sulfo-α,α-dimethyl-valeric acid, in analytically pure form, passed over at B.P. 75°–83° C./$10^{-3}$ mm. Hg ($n_D^{20} = 1.4895$).

Example 4

Using the apparatus of Example 1, a solution of 410 gm. of cyclohexane carboxylic acid chloride in 400 gm. of carbon tetrachloride was reacted at 10° C. over a period of four hours with 220 gm. of sulfur dioxide and 170 gm. of chlorine. The solvent, a small amount of sulfuryl chloride, and unreacted starting material were then distilled off under a vacuum of 30–0.1 mm. Hg. The distillation residue (382 gm.) was fractionated under high vacuum. The fraction boiling at 105°–111° C./5($10^{-3}$) mm. Hg contained a mixture of position isomers of sulfo-cyclohexane carboxylic acid dichloride in analytically pure form. ($n_D^{20} = 1.5186$).

Example 5

Using the apparatus of Example 1, a solution of 400 gm. of lauric acid dichloride in 450 gm. of carbon tetrachloride was reacted over the course of 7 hours with 130 gm. of chlorine and 250 gm. of sulfur dioxide at 5°–10° C. After removal of dissolved gases in a stream of nitrogen, the solvent was distilled off under a vacuum of 100–2 mm. Hg. Next the unreacted lauric acid chloride was removed under a vacuum of $10^{-3}$ mm. Hg. The distillation residue (chlorine content: 21.1%; sulfur content: 9.5%) amounting to 241 gm. contained a mixture of position isomers of sulfo-lauric acid dichloride together with small amounts of chloro-lauric acid chloride.

Although specific embodiments have been shown and described, it is to be understood that they are illustrative, and should not be construed as limiting on the scope and spirit of the invention.

What is claimed is:

1. A process for the preparation of chloro-sulfonyl carboxylic acid chlorides having a —COCl group and a —SO$_2$Cl group in the molecule which comprises reacting sulfur dioxide and chlorine with a member selected from the group consisting of saturated aliphatic and alicyclic carboxylic acid chlorides having at most 12 carbon atoms and having a —C—H bond removed by at least the beta position from the —COCl group at a temperature of from about −40° C. to about 100° C. under irradiation with light of wavelengths from about 2000 A. to about 7000 A.

2. A process as in claim 1 wherein said temperature is between about −20° C. and about 40° C.

3. A process as in claim 1 wherein said light is of wavelengths between about 3000 A. and about 5000 A.

4. A process as in claim 1 wherein a solvent inert under the reaction conditions is present.

References Cited by the Examiner

UNITED STATES PATENTS 2,528,320   10/1950   Roberts et al. ———— 204—162
2,749,365   6/1956   Dazzi ———————— 260—543

HOWARD S. WILLIAMS, *Primary Examiner.*